UNITED STATES PATENT OFFICE.

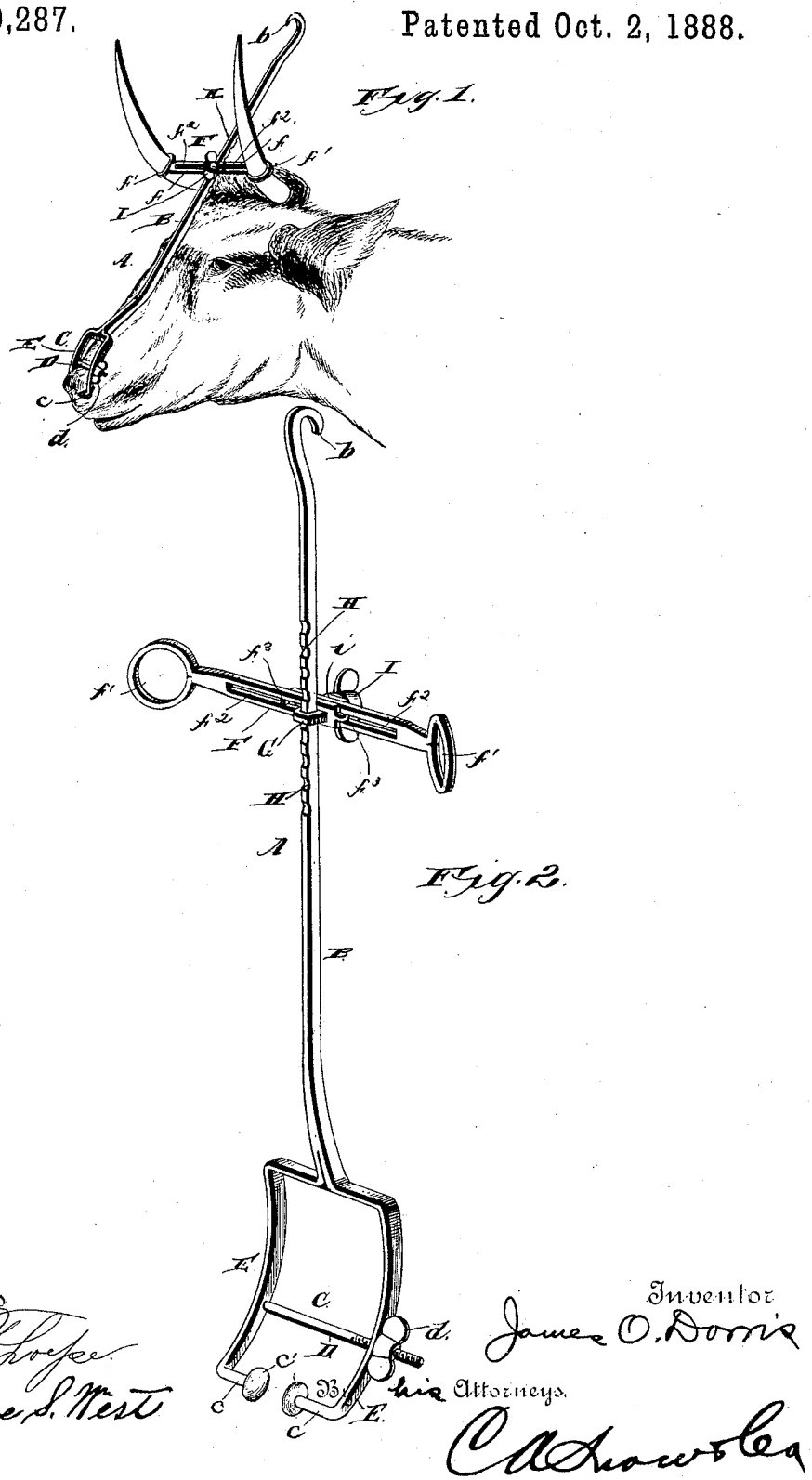

JAMES ORSON DORRIS, OF AUBURN, TEXAS.

HEAD-FRAME FOR CATTLE.

SPECIFICATION forming part of Letters Patent No. 390,287, dated October 2, 1888.

Application filed June 26, 1888. Serial No. 278,264. (No model.)

*To all whom it may concern:*

Be it known that I, JAMES ORSON DORRIS, a citizen of the United States, residing at Auburn, in the county of Ellis and State of Texas, have invented a new and useful Improvement in Head-Frames, of which the following is a specification.

The invention relates to head-frames or frontlet frames to prevent cattle from breaking down or going through fences; and it consists in the construction and novel combination of parts, hereinafter described, illustrated in the accompanying drawings, and pointed out in the appended claims.

In the drawings, Figure 1 is a perspective view of the device attached to the head of an ox. Fig. 2 is a detail perspective view of the device detached.

Referring to the drawings by letter, A designates the main frame of the device, composed of the longitudinal bar B, having the frontwardly-curved hook $b$ at its upper end and the rectangular frame C at its lower end, the inwardly-bent arms $c$ $c$ of which frame have on their ends which face each other the balls $c'$ $c'$, which, when the device is in place, rest against the opposite sides of the septum of the nose, the said arms $c$ entering the nostrils of the animal on each side, as shown. The said balls can be held more or less tightly in place by the long bolt D, which passes through opposite openings in the side bars of the frame C, and is engaged by the thumb-nut $d$ outside of one of said arms, the said bolt lying on the face of the animal above the nose.

The side bars of the frame C are made convex outwardly, as at E, and the bar B, just above said frame, is made concave outwardly, as shown, to fit closely down on the face of the animal when in place.

F is a transverse extensible bar, composed of two similar sections, $f$, standing out in opposite directions from the bar B and provided with rings $f'$ on their outer ends, to fit upon the horns of the animal. The shanks of said sections are provided with the longitudinal slots $f^2$, and with the end studs, $f^3$, the stud of each section entering the slot of the opposite section and keeping the two aligned. The said bar F is kept in place by the hook G, that passes between the slots $f^2$ and engages between the rack-teeth H on the inner edge of the bar B, one arm of said hook being threaded and engaged by a thumb-nut, I, and washer $i$ on the outer side of the bar B. By means of the said extensible bar the device can be fitted to animals having heads of different widths, and by means of the rack-teeth H and the hook and thumb-nut it can be fitted to animals having different lengths of head.

When the animal tries to break through a fence, the hook $b$ will catch on a rail or other portion of the fence and will cause the balls $c'$ to pull upon its nostrils and the septum of its nose, thereby inflicting pain and causing the animal to desist. In this action the rings on the horns become fulcrum-points, so that the part of the frame below the bar F will be moved inward or outward thereon.

Having described my invention, I claim—

1. The herein-described head-frame, comprising the bar B, bearing longitudinally on the face of the animal, bent forward at its upper end to form a hook, $b$, and provided with a rearwardly-convex bend near its lower end, the rectangular frame C, integral with the lower end of the bar B, having its sides forwardly convexed, as at E, and provided with the inwardly-extending arms $c$, the adjusting-bolt connecting the sides of the frame, and the transverse bar F, carried by the bar B and provided with rings $f'$, for the purpose described, substantially as specified.

2. The combination, with the rectangular frame C and bar B, provided on its inner edge with the rack-teeth H, of the slotted transverse bars, each having a ring on its end, the hook passing through the slots in said bars and engaging between said teeth, and the nut engaging the threaded end of said hook outside of the slotted bars, substantially as specified.

3. The combination, with the rectangular frame and the bar B, having the rack-teeth H on its inner edge, of the extensible bar F, composed of two sections, each provided with a longitudinal slot, $f^2$, a stud, $f^3$, on its inner end, and a ring, $f'$, on its outer end, the connecting-hook G, and the thumb-nut I, engaging the threaded end of said hook, substantially as specified.

In testimony that I claim the foregoing as my own I have hereto affixed my signature in presence of two witnesses.

JAMES ORSON DORRIS.

Witnesses:
   THOS. W. FLORER,
   I. N. MORRIS.